United States Patent
Black et al.

(10) Patent No.: US 7,345,586 B2
(45) Date of Patent: Mar. 18, 2008

(54) SYSTEM AND METHOD FOR TRANSFERRING DATA TO AN ELECTRONIC DEVICE

(75) Inventors: Greg R. Black, Vernon Hills, IL (US); John Boos, Grayslake, IL (US); Rafael Colorado, Long Grove, IL (US)

(73) Assignee: Motorola Inc, Schaumburg, IL (US)

( * ) Notice: Subject to any disclaimer, the term of this patent is extended or adjusted under 35 U.S.C. 154(b) by 226 days.

(21) Appl. No.: 11/170,422

(22) Filed: Jun. 29, 2005

(65) Prior Publication Data
US 2007/0001849 A1 Jan. 4, 2007

(51) Int. Cl.
*G08B 13/14* (2006.01)
(52) U.S. Cl. ............... 340/572.3; 340/5.4; 340/10.51
(58) Field of Classification Search ............ 340/572.1, 340/572.3, 572.7, 505, 10.1, 10.5, 10.51, 340/5.4–5.42; 705/17, 41; 235/492
See application file for complete search history.

(56) References Cited

U.S. PATENT DOCUMENTS

| | | | | |
|---|---|---|---|---|
| 4,673,923 A | * | 6/1987 | Boscoe et al. ............ | 340/572.3 |
| 6,127,938 A | * | 10/2000 | Friedman .................. | 340/693.6 |
| 6,805,291 B2 | | 10/2004 | Chhatpar et al. | |
| 2003/0132301 A1 | | 7/2003 | Selker | |
| 2004/0143549 A1 | * | 7/2004 | Likourezos ................... | 705/40 |
| 2006/0125641 A1 | * | 6/2006 | Forster ..................... | 340/572.7 |
| 2006/0231611 A1 | * | 10/2006 | Chakiris et al. ............ | 235/380 |
| 2006/0289645 A1 | * | 12/2006 | Schuessler .................. | 235/492 |

FOREIGN PATENT DOCUMENTS

| | | |
|---|---|---|
| EP | 1418534 A1 | 12/2004 |
| GB | 2379739 A | 3/2003 |
| WO | WO 00/34605 | 6/2000 |
| WO | WO 01/71848 A1 | 9/2001 |
| WO | WO 02/095675 | 11/2002 |
| WO | WO 03/046842 | 6/2003 |
| WO | WO 03/077454 | 9/2003 |
| WO | WO 03/077569 | 9/2003 |
| WO | WO 2004/027689 | 4/2004 |

* cited by examiner

*Primary Examiner*—Thomas Mullen
(74) *Attorney, Agent, or Firm*—Randall S. Vaas

(57) ABSTRACT

A radio frequency identification (RF ID) tag (202) and a method for communicating data from an RF ID card to an electronic device (102) are disclosed. The RF ID tag comprises one or more removable materials that conceal the data (106). The presence of the one or more removable materials disables the RF ID tag.

15 Claims, 4 Drawing Sheets

SYSTEM AND METHOD FOR TRANSFERRING DATA TO AN ELECTRONIC DEVICE

FIELD OF THE INVENTION

This invention relates in general to radio frequency identification (RF ID) tags, and more specifically to RF ID cards for transferring data to electronic devices.

BACKGROUND

People are generally not comfortable purchasing intangible products, such as digital content or digital rights unless the purchase is accompanied by a physical object. As a result, many people prefer to buy packaged computer software. Nowadays, prepaid cards are used to transfer data, such as digital content and digital rights to electronic devices. Examples of such data include, but are not limited to, an authorization code, a song or a video.

A known method utilized for the transfer of data using prepaid cards involves manual transfer of data. Manual transfer involves scratching a prepaid card to reveal a code. The code can then be entered by means of a keypad of an electronic device. In the case of purchasing mobile telephone air-time, this is followed by an over-the-air transfer, and a confirmation notification to the end user of successful transfer of the data. Although accurate, a manual transfer of data from the prepaid card to the electronic device, especially entering the prepaid code in the electronic device by using the keypad, is a cumbersome process.

Another known method for transferring data to an electronic device is by using a radio frequency identification (RF ID) tag within a prepaid card. An RF ID reader in the electronic device is used to scan the RF ID tag in the prepaid card to automatically transfer the data to the electronic device. One problem with the implementation of this method is that since an RF ID tag can be remotely detected, the possibility of theft of data increases, since it can be remotely accessed without purchasing and using a prepaid card.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
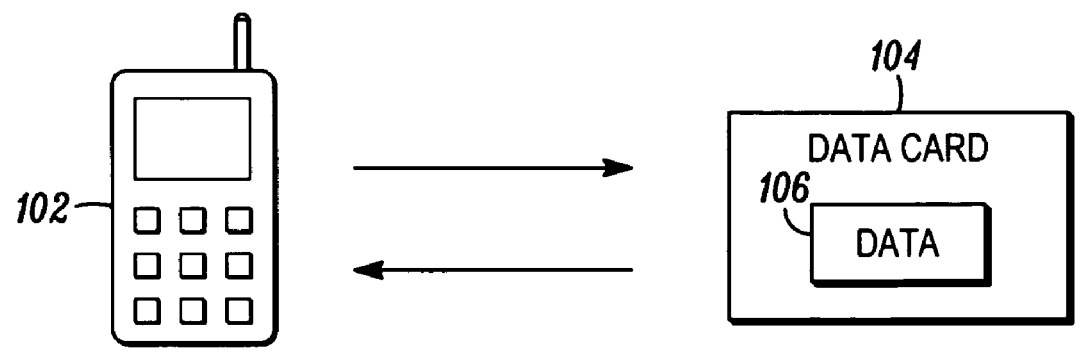
FIG. 1 illustrates an exemplary environment, in accordance with some embodiments of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

In an embodiment of the present invention, a system and method for transferring data to an electronic device is disclosed. An RF ID tag within the system includes one or more removable materials. The one or more removable materials conceal data. The presence of the one or more removable materials disables the RF ID tag.

Before describing in detail the particular system and method for transferring data to an electronic device in accordance with the present invention, it should be observed that the present invention resides primarily in combinations of method steps and apparatus components related to a system and method for transferring data to an electronic device. Accordingly, the apparatus components and method steps have been represented where appropriate by conventional symbols in the drawings, showing only those specific details that are pertinent to understanding the present invention so as not to obscure the disclosure with details that will be readily apparent to those of ordinary skill in the art having the benefit of the description herein.

In this document, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" or "comprising . . . a", does not, without more constraints, preclude the existence of additional identical elements in the process, method, article, or apparatus that comprises the element.

A "set" as used in this document, means a non-empty set (i.e., comprising at least one member). The term "another", as used herein, is defined as at least a second or more. The terms "including" and/or "having", as used herein, are defined as comprising. The term "coupled", as used herein with reference to electro-optical technology, is defined as connected, although not necessarily directly, and not necessarily mechanically.

FIG. 1 illustrates an exemplary environment, in accordance with some embodiments of the present invention. The exemplary environment includes an electronic device 102 and a data card 104. Examples of the electronic device 102 include, but are not limited to, a mobile telephone, a personal digital assistant (PDA), an MPEG-1 (Motion Pictures Experts Group) Audio Layer 3 (MP3) player and the like. The data card 104 includes one or more data 106, which can be transferred from the data card 104 to the electronic device 102. The data 106 is stored on the data card 104 in an electronic format. Examples of the data 106 include, but are not limited to, an authorization code, a song, a video and the like. In an embodiment of the present invention, the data card 104 is used for purchasing prepaid airtime and/or recharging a prepaid airtime balance in a mobile telephone.

In an embodiment of the present invention, the data 106 is transferred to the electronic device 102 by entering the data 106 manually, using a keypad of the electronic device 102. In another embodiment of the present invention, the data 106 is automatically transferred to the electronic device 102. The automatic transfer can be accomplished by using a wireless communication medium, such as a radio frequency identification (RF ID) tag in the data card 104, and an RF ID reader in the electronic device 102.

Figure 2:
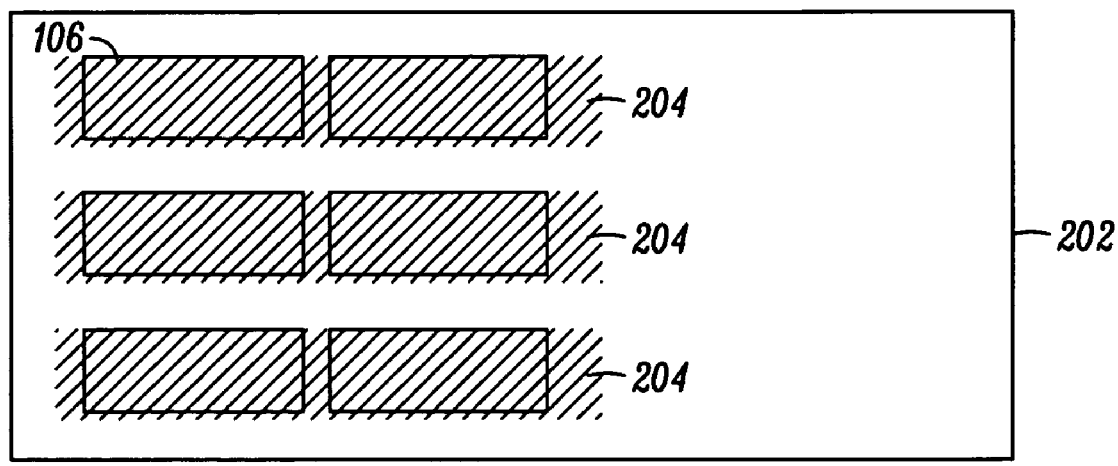
FIG. 2 illustrates an exemplary radio frequency identification (RF ID) tag, in accordance with one embodiment of the present invention.

FIG. 2 illustrates an exemplary RF ID tag 202, in accordance with an embodiment of the present invention. The RF ID tag 202, for example, can be included within the data card 104 of FIG. 1. The RF ID tag 202 includes a removable material 204 concealing the data 106. In an embodiment of the present invention, more than one removable material concealing different data may be present. The presence of the removable material 204 disables the RF ID tag 202. On removal of the one or more removable materials, the RF ID tag 202 is enabled, allowing the automatic transfer of the data 106 (for example, from the data card 104) to the electronic device 102. Exemplary methods of removing the removable material 204 include using an object to scratch the removable material 204.

Figure 3:
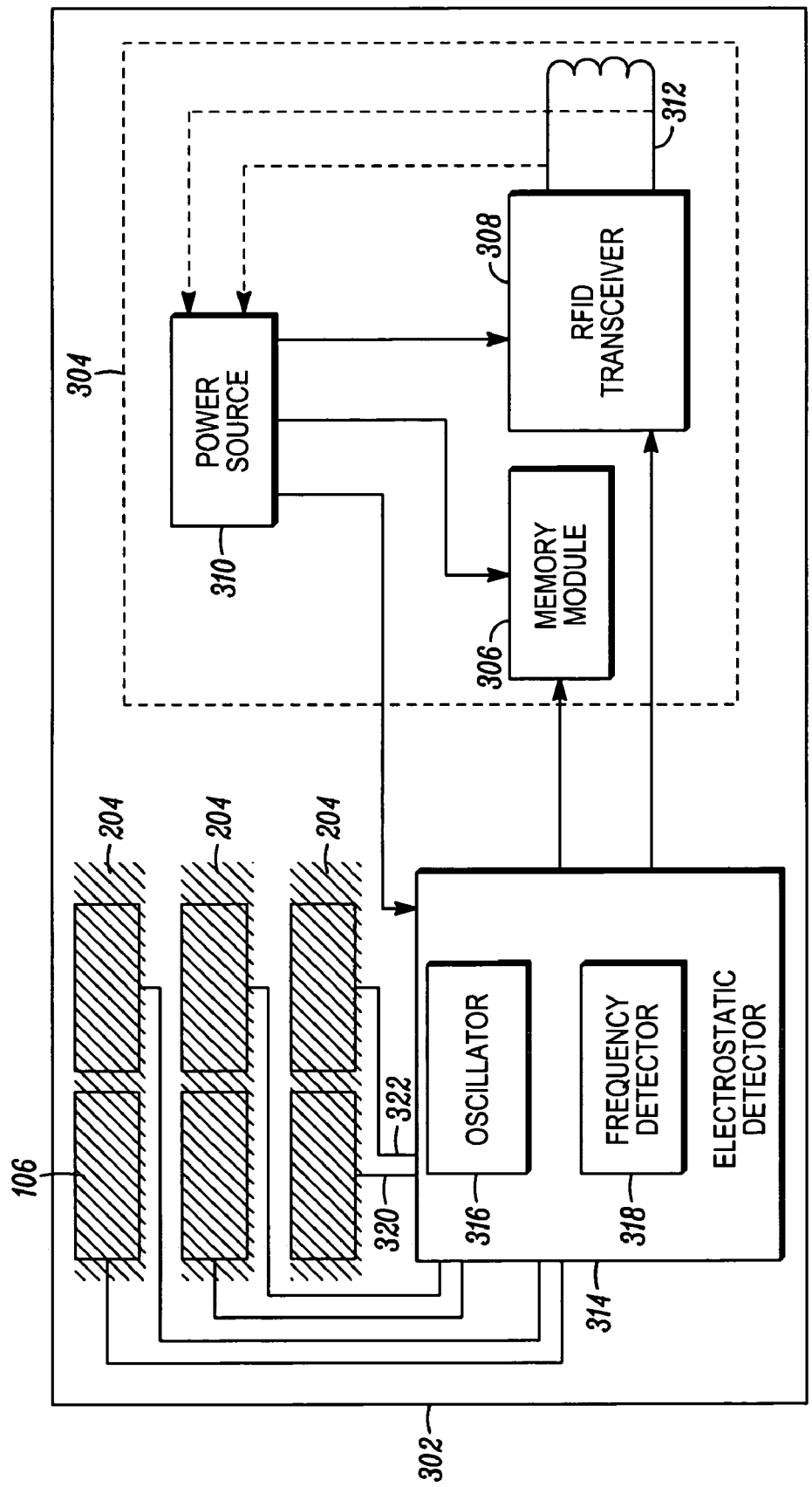
FIG. 3 illustrates an RF ID card, in accordance with one embodiment of the present invention.

FIG. 3 illustrates an example of an RF ID card 302, in accordance with one embodiment of the present invention. The RF ID card 302 includes one or more removable materials, such as removable material 204, and an RF ID communication means 304. The RF ID communication means 304 includes a memory module 306, a transceiver 308, a power source 310, and an RF ID antenna 312. The RF ID card 302 further includes an electrostatic detector 314.

The RF ID card 302 can operate in multiple operation modes. In a first operation mode, the data 106 can be transferred manually, for example, by using a keypad of the electronic device 102 of FIG. 1 when connected to the RF ID card 302. In an embodiment of the present invention, the data 106 can be an authorization code concealed by one or more removable materials.

In a second operation mode, the RF ID communication means 304 can be used for the automatic transfer of the data 106, for example, to the electronic device 102 of FIG. 1 via a wireless communication channel. The memory module 306 in the RF ID communication means 304 stores the data 106, and can also store other additional information. The RF ID transceiver 308 receives and responds to radio frequency signals received from the RF ID reader in the electronic device 102. The RF ID transceiver 308 transfers the data 106, stored in the memory module 306, when requested by the RF ID reader on the activation of the RF ID card 302. The power source 310 supplies power to the memory module 306, the RF ID transceiver 308, and the electrostatic detector 314. In an embodiment of the present invention, the power source 310 is a battery, as in an active RF ID tag. In another embodiment of the present invention, the power source 310 is a signal rectifier, for rectifying the signal received in the RF ID antenna 312, as in a passive RF ID tag.

In an embodiment of the present invention, the RF ID card 302 is suitable for operation in the first operation mode as well as the second operation mode.

The electrostatic detector 314 includes an oscillator 316 and a frequency detector 318. The frequency detector 318 detects variation in the frequency of the oscillator 316. In an embodiment of the present invention, the frequency of oscillation of the oscillator 316 depends on impedance between terminals 320 and 322. The terminals 320 and 322 are conductive plates connected to the electrostatic detector 314. In an embodiment of the present invention, the RF ID card 302 can be configured so that the impedance between the terminals 320 and 322 depends on the presence of the removable material 204 in proximity to the terminals 320 and 322. In an embodiment of the present invention, there is more than one removable material capacitively coupled with more than one pair of terminals. In an embodiment of the present invention, the removable material 204 is a conductive material capacitively coupled to terminals 320 and 322, and the removal of the removable material 204 thereby causes a reduction in the capacitance between the terminals 320 and 322. In another embodiment of the present invention, the one or more removable materials are non-conductive materials. Examples of the non-conductive materials include, but are not limited to, a dielectric material, a magnetically permeable material, and the like. In another embodiment, the removable material 204 is a dielectric material in close proximity to terminals 320 and 322, and the removal of the removable material 204 thereby causes a reduction in the capacitance between the terminals 320 and 322. Whenever the one or more removable materials are removed or scratched, the frequency of the oscillator 316 changes. The variation in the frequency of the oscillator 316 is detected by the frequency detector 318, which, in turn, enables the RF ID communication means 304. The enabling of the RF ID communication means 304 allows the transfer of the data 106 from the RF ID card 302 to the electronic device 102. In an embodiment of the present invention, the oscillator 316 does not oscillate until the one or more removable materials are removed. In another embodiment of the present invention, the electrostatic detector 314 generates a data selection signal indicating which of the more than one pair of terminals has had its impedance altered by the removal of removable material 204. The data selection signal is connected to the memory module 306, in order to transfer the particular data 106 stored in the memory module 306, and concealed by the removable material 204 that is removed.

Figure 4:
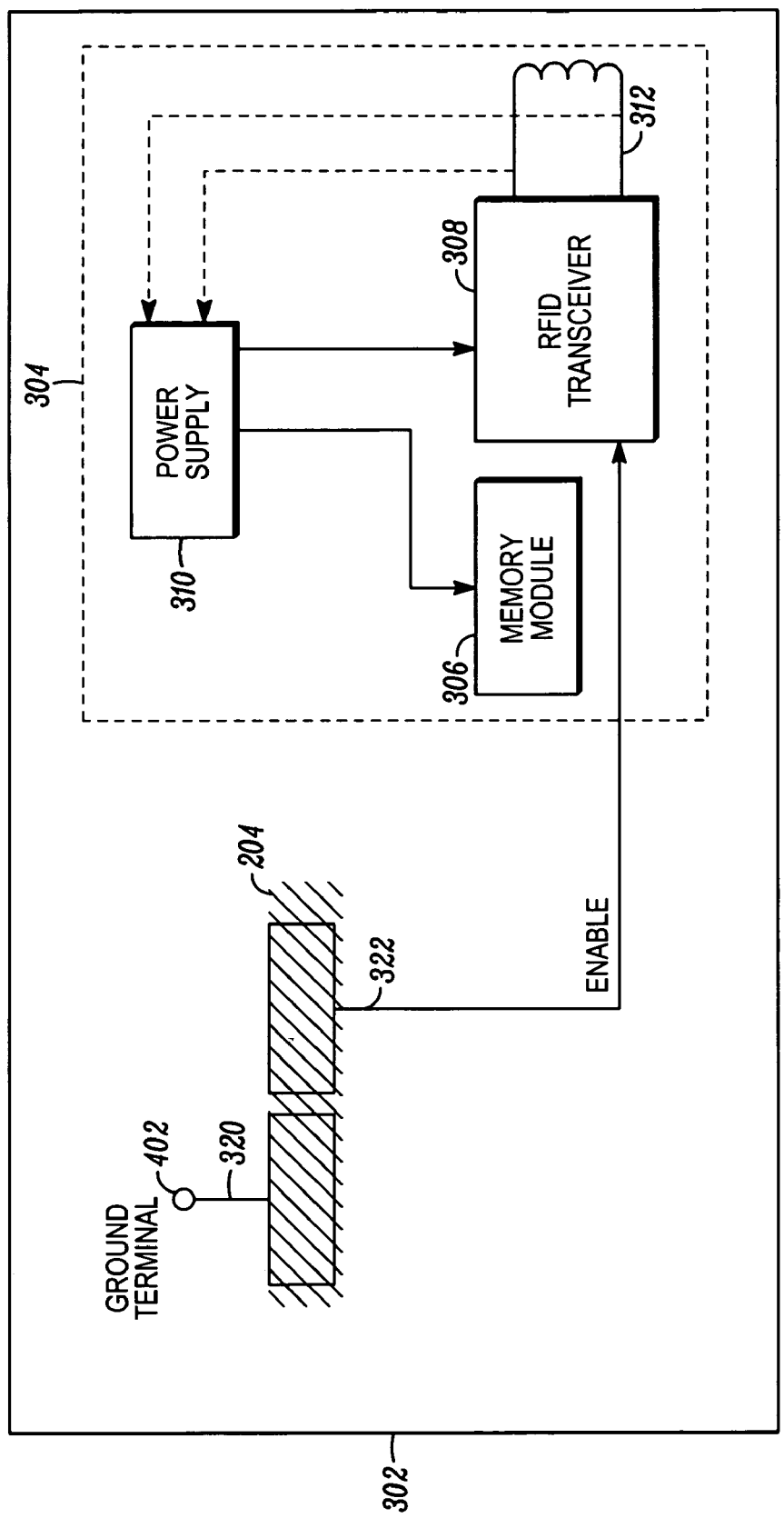
FIG. 4 illustrates an RF ID card, in accordance with one embodiment of the present invention.

FIG. 4 illustrates the RF ID card 302, in accordance with one embodiment of the present invention. The RF ID card 302 includes the one or more removable materials, the RF ID communication means 304, and a ground terminal 402. The RF ID communication means 304 includes a memory module 306, an RF ID transceiver 308, and a power source 310.

In an embodiment of the present invention, the RF ID communication means 304 can be enabled by contacting a logic input in the RF ID communication means 304, which causes the memory module 306, the RF ID transceiver 308, or the power source 310 to be enabled or disabled. The presence of the one or more removable materials disables the RF ID card 302. In an embodiment of the present invention, the one or more removable materials are electrically conductive materials contacting the pair of terminals 320 and 322. Examples of the electrically conductive materials include, but are not limited to, a conductive ink, a conductive tape, a conductive foil, and the like. The conductive material completes a circuit between the RF ID transceiver 308 and the ground terminal 402. This sends a logical input 0, or a DISABLE signal, to the RF ID transceiver 308. However, when the conductive material is removed, the circuit breaks and a logic signal 1, or an ENABLE signal, is sent to the RF ID transceiver 308, which activates the RF ID card 302 for transferring the data 106 stored in the memory module 306, and concealed by the removable material 204 that is removed.

Figure 5:
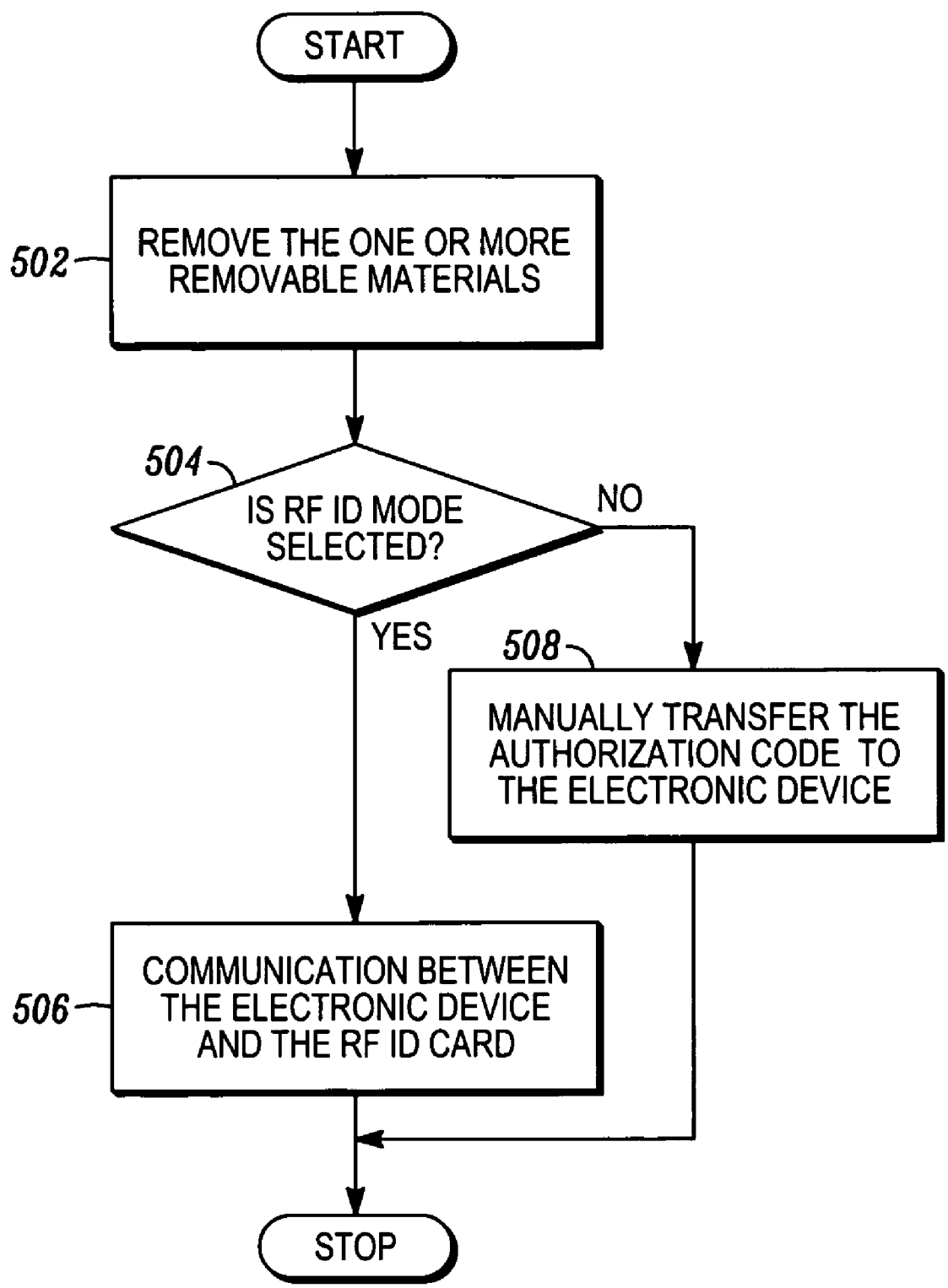
FIG. 5 is a flowchart illustrating a method for communicating data from an RF ID card to an electronic device, in accordance with some embodiments of the present invention.

FIG. 5 is a flowchart illustrating a method for communicating the data 106 from the RF ID card 302 to the electronic device 102, in accordance with some embodiments of the present invention. At step 502, one or more removable materials are removed or scratched. At step 504, it is determined whether the RF ID mode is selected at the electronic device 102. In an embodiment of the present invention, the selection is accomplished by activating the RFID reader in the electronic device 102. If, for example the data card 104 is used for replenishing airtime minutes, the activation may be a menu option in an airtime replenishment program running on the electronic device 102. The activation could be specific to the purpose of the data card 104 as in the previous example, or it could be a generic activation. In the case of the generic activation, the data 106 contains an identifying sequence to be used by the electronic device 102 for identifying the purpose of the data. In an embodiment of the present invention, the identifying sequence is a prearranged code for selecting among prearranged programs for running on the electronic device 102. In another embodiment of the present invention, the identifying sequence is a command sequence; such as an AT command sequence, for controlling the electronic device 102. In an embodiment of the present invention, if the RF ID mode is selected, a signal is sent from the electronic device 102 to the RFID card 302, indicating a request to transfer the data 106. The signal from the electronic device 102 to the RFID card 302 is thereby a data transfer initiation signal. If the removable material 204 has been removed, the RFID communication means 304 is enabled and the data is transferred from the RFID card 302 to the electronic device 102. The RF ID mode is thereby enabled in response to the removal of one or more removable materials. At step 506, a communication between the electronic device 102 and the RF ID card 302 is enabled. However, if the RF ID mode is not selected on the electronic device 102, then the authorization code, made visible by removing the material 204, may be manually entered into the electronic device 102 via a keypad at step 508.

In an embodiment of the present invention, the data 106 communicated from the RF ID card 302 to the electronic device 102 is a song or a video that is transferred to the electronic device 102 via the RF ID card 304. The transfer can be accomplished by direct transfer of the data 106, or by transfer of a network address such as a URL and a pass code.

In another embodiment of the present invention, transfer of the data 106 takes place in more than one step. For example, the RF ID card 302 can perform one function before the activation of the RF ID communication means 304, and a second function after the activation. In other words, in a pre-activated state, the RF ID card 302 can provide information about a service. After the activation of the RF ID communication means 304, the RF ID card 302 can transfer data related to the service to the electronic device 102. For example, when purchasing music or videos, the RF ID card 302, in a pre-activated state, can provide information regarding the preview and/or limited digital rights. After the RF ID communication means 304 is activated, it can provide a pass code to download the entire song and digital rights information.

It will be appreciated the system and method described herein may be comprised of one or more conventional processors and unique stored program instructions that control the one or more processors to implement, in conjunction with certain non-processor circuits, some, most, or all of the functions of the system and method described herein. The non-processor circuits may include, but are not limited to, a radio receiver, a radio transmitter, signal drivers, clock circuits, power source circuits, and user input devices. As such, these functions may be interpreted as steps of a method to transfer data to an electronic device. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein.

It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

In the foregoing specification, the invention and its benefits and advantages have been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. A radio frequency identification (RFID) tag comprising:
   one or more removable materials concealing data, wherein the presence of the one or more removable materials disables the RFID tag; and
   an electrostatic detector, comprising:
     an oscillator; and
     a frequency detector,
   wherein frequency of oscillation of the oscillator changes on removing the one or more removable materials.

2. The RF ID tag as recited in claim 1 further comprising:
   a memory module for storing the data; and
   an RF ID transceiver for transmitting the data.

3. The RF ID tag as recited in claim 1 further comprising a signal rectifier.

4. The RF ID tag as recited in claim 1 further comprising a power source.

5. The RF ID tag as recited in claim 1 wherein the one or more removable materials are electrically conductive materials, wherein the electrically conductive materials are selected from a group comprising a conductive ink, a conductive tape, and a conductive foil.

6. The RF ID tag as recited in claim 1 wherein the one or more removable materials are non-conductive materials, wherein the non-conductive materials are selected from a group comprising a dielectric material and a magnetically permeable material.

7. A radio frequency identification (RF ID) card capable of multiple operation modes, the RF ID card comprising:
   an authorization code concealed by one or more removable materials, wherein the authorization code is for use in a first operation mode comprising authorizing communication between the RF ID card and an electronic device; and
   a radio frequency identification (RF ID) communication means for use in a second operation mode, wherein the presence of the one or more removable materials disables the RF ID communication means.

8. The RF ID card as recited in claim 7 wherein the one or more removable materials are electrically conductive materials, wherein the electrically conductive materials are selected from a group comprising a conductive ink, a conductive tape, and a conductive foil.

9. The RF ID card as recited in claim 7 wherein the one or more removable materials are non-conductive materials, wherein the non-conductive materials are selected from a group comprising a dielectric material and a magnetically permeable material.

10. The RF ID card as recited in claim 7 further comprising an electrostatic detector, the electrostatic detector comprising:
   an oscillator; and
   a frequency detectors,
   wherein frequency of oscillation of the oscillator changes on removing the one or more removable materials.

11. The RF ID card as recited in claim 7 wherein the RF ID communication means comprises:
   an RF ID transceiver for transmitting and receiving a signal; and
   a memory module for storing the data.

12. The RF ID card as recited in claim 7 wherein the RF ID communication means further comprises a signal rectifier.

13. The RF ID card as recited in claim 7 wherein the RF ID communication means further comprises a power source.

14. A method of communicating data from a radio frequency identification (RF ID) card to an electronic device, wherein an authorization code is concealed using one or more removable materials, the electronic device comprising an RF ID reader, the method comprising:
   removing the one or more removable materials;
   determining whether an RF ID mode is selected;
   communicating between the electronic device and the RF ID card when the RF ID mode is selected; and
   manually transferring the authorization code to the electronic device when the RF ID mode is not selected.

15. The method as claimed in claim 14 further comprising prior to the communicating step:
   sending a signal from the electronic device to the RF ID card initiating the transfer of data by RFID means.

* * * * *